United States Patent [19]
Sato et al.

[11] Patent Number: 5,172,721
[45] Date of Patent: Dec. 22, 1992

[54] CHECK VALVE FOR FUEL TANK

[75] Inventors: Kyokuichi Sato; Juichi Fujita, both of Sojal, Japan

[73] Assignee: OM Industrial Co., Ltd., Okayama, Japan

[21] Appl. No.: 833,337

[22] Filed: Feb. 10, 1992

[30] Foreign Application Priority Data

Feb. 15, 1991 [JP] Japan .............................. 3-23392[U]

[51] Int. Cl.⁵ .............................................. F16K 15/03
[52] U.S. Cl. ................................ 137/515; 137/512.1; 137/799; 220/86.2
[58] Field of Search ................... 137/512.1, 515, 515.5, 137/515.7, 799; 251/150; 220/86.2; 141/348

[56] References Cited

U.S. PATENT DOCUMENTS

| | | | |
|---|---|---|---|
| 4,128,111 | 12/1978 | Hansen et al. | 137/515.7 |
| 4,492,249 | 1/1985 | Arino | 137/515 |
| 4,774,981 | 10/1988 | Mizusawa | 137/512.1 |
| 5,111,858 | 5/1992 | Aittama | 220/86.2 |

*Primary Examiner*—Robert G. Nilson
*Attorney, Agent, or Firm*—Koda and Androlia

[57] ABSTRACT

Even if a bellows is provided in the vicinity of a fuel check valve to be installed between a fuel filler port and a tank, the valve can be operated stably with a structure in which a valve body of the check valve comprises an annular main body section and a tubular extension section extending over the substantially whole length of the inner peripheral side of the bellows.

3 Claims, 2 Drawing Sheets

5,172,721

CHECK VALVE FOR FUEL TANK

BACKGROUND OF THE INVENTION

1. Industrial Field of the Invention

The present invention relates to an improvement of a fuel check valve which can be provided between a fuel filler port and a fuel tank. It is particularly useful as a check valve of liquid fuel to be attached to a fuel supply pipe of a liquid fuel tank for an automobile including a gasoline engine or a diesel engine.

2. Description of the Prior Art

In order to prevent fuel from unfavorably flowing back to a fuel filler port in response to an increase of pressure in a fuel tank when fuel is supplied to the tank in an automobile or the like or in such occasions, a check valve has conventionally been provided in a flow passage. The valve is operated in such a manner as to be opened while the fuel is flowing in the normal direction at the time of fuel supply, and to be closed when the fuel splashes back and flows in the reverse direction. One example of such check valves is disclosed in the U.S. Pat. No. 4,128,111. This check valve is constituted of a valve body, a valve disc, a pivot pin and so on, and the number of such component parts is thus large. Besides, after the pivot pin is assembled with other members, it is necessary to crush both tips of the pivot pin so as to prevent the pin from coming off.

The inventors of the present application have tried to achieve facilitation of the assembly operation and reduction of the number of component parts of such a reverse flow preventing device for a fuel tank, and investigated the structure with which the valve disc will not come off easily and the assembled unit will not be detached from a pipe accidentally. As a result, the inventors could suggest a device of this type previously as U.S. application Ser. No. 758,891.

In the case where a reverse flow preventing device for a fuel tank comprises a single valve plate as the above-mentioned examples do, it must be installed at a predetermined location in a restricted direction to make it function normally. Moreover, there is a risk that fuel can not be supplied if the valve plate is stuck in the closed condition due to any adhesive substances such as tar and impurities of fuel depositing on bearing portions. Furthermore, the fuel flow within a fuel supply pipe is a turbulence at the time of fuel supply, and this is one of the causes of deterioration in fuel supply efficiency. Fuel should preferably be introduced into a tank as a laminar flow. One of the examples in which these factors are improved to some extent is disclosed in U.S. Pat. No. 4,774,981. In this example, however, the valve plate is divided into two sections, and therefore, it is still necessary to take the installation direction into account.

For this reason, the inventors developed and suggested in U.S. application Ser. No. 720,597 a reverse flow preventing device for a fuel tank, which is characterized in that it comprises a valve body whose annular inside space is divided equally into more than three sectorial sections on the division lines of which a pivot member is provided, and valve plates which have the shape corresponding to these sectorial sections and swing about the pivot member which serves as bearings, and that swinging restriction means are provided on the bearings of the pivot member so that swinging movements of the valve plates will be restricted to a range of 90° or less and to a single direction.

This makes it possible ① to eliminate the directional restriction in the installation of the device, ② to decrease the risk at the time of malfunction of the valve plates, and ③ to provide the device with a flow straightening function as an additional function.

However, there are various kinds of fuels, and some of them, as gross gasoline, contain tar in large quantities. If ordinary shafts and bearings are used for such fuel, it is feared that tar will adhere to the valve plates to intervene their operations. The inventors further investigated the valve plates, developed the structure with which to prevent the malfunction of valve plates due to tar and impurities adhering to them and also to reduce the assembly labor, and suggested it in the above-mentioned U.S. application Ser. No. 720,597.

In this structure, the valve operating portion comprises a plurality of valve plates so that some of the valve plates will always be immersed in fuel and function to straighten the flow even if the valve plates are provided at a different angle. As a result, there will be no malfunction of the valve plates due to impurities adhering to them, and the assembly labor will be lessened.

With such a structure, however, if a bellows is provided in the vicinity of the check valve, it is feared that turbulence of the fuel flow or splashing of the fuel in the bellows makes the operation of the valve unstable.

It is therefore an object of the present invention to provide a structure which can prevent unstable operation of a check valve even if a bellows is provided near the check valve.

SUMMARY OF THE INVENTION

As a result of the study of the above problems, they can be solved by a valve body of a check valve which includes a tubular extension section with a smooth inner surface extending over the substantially whole length of the inner peripheral side of a bellows, the extension section being integrally formed with or provided separately from an annular main body section. The check valve should preferably be made of an oil-resistant plastic material. The annular main body section and the tubular extension section may be integrally formed of a plastic material, or separately formed of hard and soft plastic materials, respectively, to be closely fitted to each other.

This extension section of the valve body can prevent flow turbulence or splashing of fuel owing to unevenness of the inner surface of the bellows, to thereby make the valve operation stable, straightening the fuel flow and decreasing its entering resistance into the tank, while ensuring the function of the valve plates as a check valve.

DETAILED DESCRIPTION OF THE INVENTION

Figure 3:
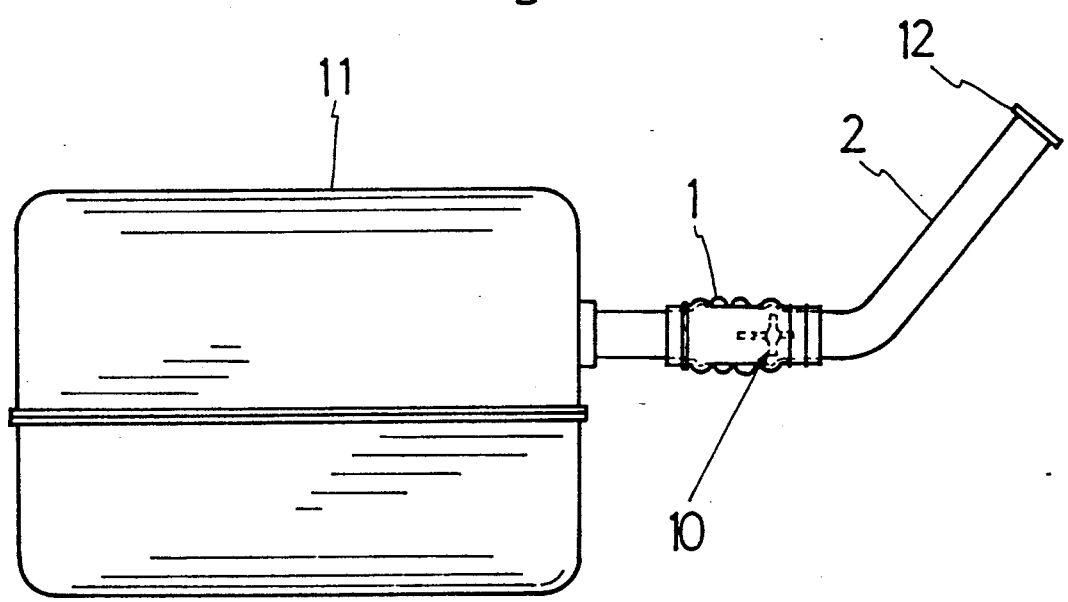
FIG. 3 is a side view showing a location of installation of the check valve to an automobile fuel tank.

Referring to FIG. 3, a check valve 10 according to the present invention is installed in joint end portions of a shock absorber bellows 1 and a fuel supply pipe 2 extending between a fuel tank 11 and a fuel filler port 12. In this embodiment, the check valve 10 is located at the inlet side of the bellows 1. However, it may, of course, be provided contrarily at the outlet side of the bellows 1. As for the location of attachment to the fuel tank 11, the check valve 10 is disposed at a location in a joint port of the fuel tank 11 to be connected with the fuel supply pipe 2 which is located on the side of the fuel filler port 12, as shown in FIG. 3. Such a check valve may be attached to an inlet pipe connected to the fuel tank.

Figure 1:
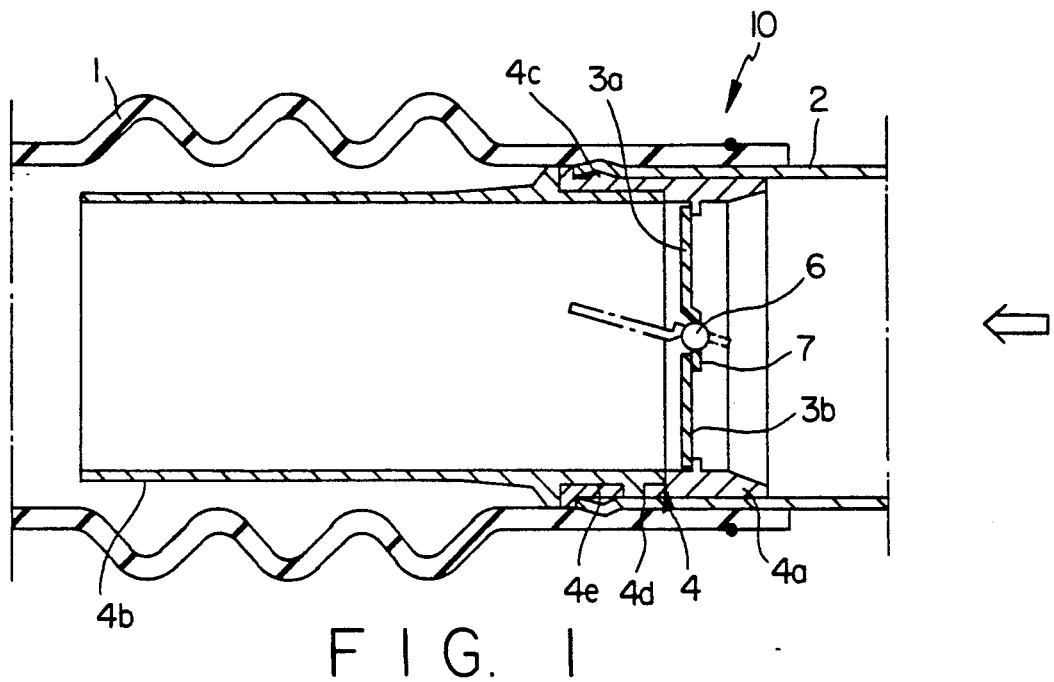
FIG. 1 is a cross-sectional view of a check valve, taken along a line I—I of FIG. 2.
Figure 2:
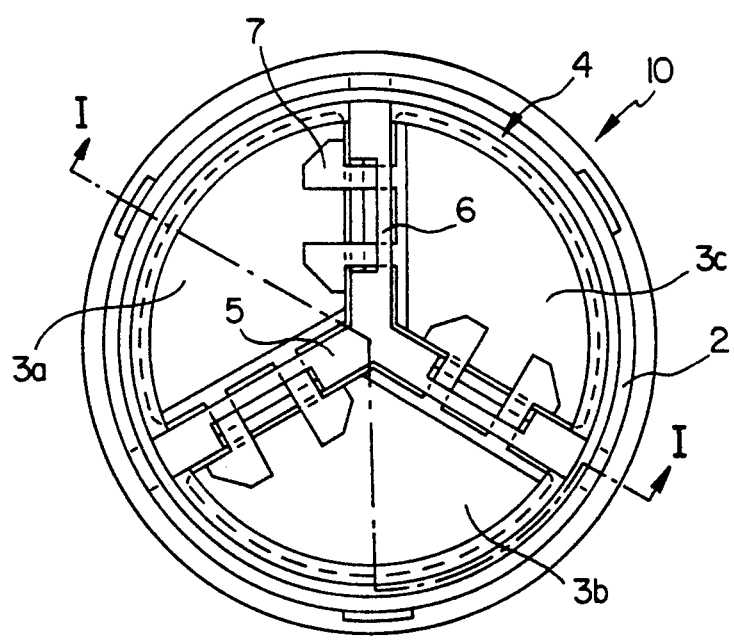
FIG. 2 is a front view of the check valve.

Referring now to FIGS. 1 and 2, a valve body 4 comprises an annular main body section 4a and a tubular extension section 4b extending over the substantially whole length of the inner peripheral side of the bellows 1. In this embodiment, the main body section 4a and the extension section 4b of the valve body 4, which have been formed separately, are tightly connected to be integral with each other. Therefore, the main body section 4a is formed not only with a plurality of projections 4c for fixing of the fuel supply pipe but also with a plurality of holes 4d at different locations so that a plurality of projections 4e formed on the tubular extension section will be fitted into them.

As shown in FIG. 2, the check valve 10 comprises sectorial valve elements 3 each formed like a plate to close a sectored portion of the inside space of the annular main body section 4a. In this embodiment, the inside space of the annular main body section 4a is divided into three sectorial portions (sector angle: 120°), on the division lines of which a pivot member 5 is provided. The valve elements 3 are of the shapes corresponding to these sectorial portions, as described above, and shafts of the valve elements are rotatably received in bearings formed on the pivot member 5. In addition, swinging restriction means 7 of the valve elements 3 are provided on the bearings 6 of the pivot member 5 so that swinging movements of the three valve elements 3a, 3b and 3c will be restricted to a range of 75° or less and also limited to an identical direction.

In the above embodiment, the valve body 4 is constituted of the annular main body section 4a and the tubular extension section 4b which are separate members; however, they may be formed integrally as a single member. But if they are formed separately, as well as advantages to be explained later in the description of the effects of the invention, there will be an advantage that a material of the most appropriate hardness can be used for each section. That is to say, the following condition can be satisfied: the main body section 4a should preferably be made of a hard material so as to obtain a certain strength of the valve and to fix it securely to the fuel supply pipe 2; on the other hand, the extension section 4b within the bellows should preferably be made of a soft material such that it can be deformed in response to deformation of the bellows and that it will not damage the bellows. It should be noted that even if the main body section 4a and the extension section 4b of the valve body 4 are formed integral with each other, the optimum hardness can be produced by controlling the thickness of each section.

With the above-described structure, there can be produced an effect that the check valve for the fuel tank can function stably to thereby increase its safety because the extension section will prevent flow turbulence and splashing of the fuel in the bellows even if the bellows is located close to the check valve.

Moreover, the valve body is constituted of the annular main body section and the tubular extension section so that, simply by removing the valve elements from the valve, it can be used as a turbulence prevention pipe in a system where the check valve is unnecessary. Furthermore, in a system where the bellows is not required, the check valve can be utilized economically by removing the tubular extension section from it.

What is claimed is:

1. A check valve for a fuel tank to be attached to a fuel supply pipe including a shock absorber bellows, wherein a valve body of said check valve comprises an annular main body section and a tubular extension section extending over the substantially whole length of the inner peripheral side of the bellows.

2. A check valve for a fuel tank according to claim 1, wherein said annular main body section and said tubular extension section are integrally formed of a plastic material.

3. A check valve for a fuel tank according to claim 1, wherein said annular main body section and said tubular extension section are separately formed of hard and soft plastic materials, respectively, to be closely fitted to each other.

* * * * *

UNITED STATES PATENT AND TRADEMARK OFFICE
CERTIFICATE OF CORRECTION

PATENT NO. :     5,172,721

DATED      :     December 22, 1992

INVENTOR(S) :    KYOKUICHI SATO et al.

It is certified that error appears in the above-identified patent and that said Letters Patent is hereby corrected as shown below:

ON THE TITLE PAGE:

Item [57] Inventors:    Change "KYOKUICHI SATO; JUICHI FUJITA, both of Sojal, Japan" to --KYOKUICHI SATO; JUICHI FUJITA, both of Okayama, Japan--

Signed and Sealed this

Second Day of November, 1993

Attest:

BRUCE LEHMAN

*Attesting Officer*     Commissioner of Patents and Trademarks